US012374738B2

(12) United States Patent
Lee et al.

(10) Patent No.: US 12,374,738 B2
(45) Date of Patent: Jul. 29, 2025

(54) BATTERY PACK, ELECTRONIC DEVICE COMPRISING SAME, AND VEHICLE

(71) Applicant: LG Energy Solution, Ltd., Seoul (KR)

(72) Inventors: Tae-Kyeong Lee, Daejeon (KR); Sung-Hoon Woo, Daejeon (KR); Young-Il Yoon, Daejeon (KR)

(73) Assignee: LG Energy Solution, Ltd., Seoul (KR)

( * ) Notice: Subject to any disclaimer, the term of this patent is extended or adjusted under 35 U.S.C. 154(b) by 570 days.

(21) Appl. No.: 17/764,797

(22) PCT Filed: Apr. 26, 2021

(86) PCT No.: PCT/KR2021/005272
§ 371 (c)(1),
(2) Date: Mar. 29, 2022

(87) PCT Pub. No.: WO2021/221416
PCT Pub. Date: Nov. 4, 2021

(65) Prior Publication Data
US 2022/0336887 A1 Oct. 20, 2022

(30) Foreign Application Priority Data
Apr. 29, 2020 (KR) ........................ 10-2020-0052831

(51) Int. Cl.
*H01M 10/613* (2014.01)
*H01M 10/625* (2014.01)
(Continued)

(52) U.S. Cl.
CPC ..... *H01M 10/6556* (2015.04); *H01M 10/613* (2015.04); *H01M 10/625* (2015.04);
(Continued)

(58) Field of Classification Search
CPC .......... H01M 10/6556; H01M 10/613; H01M 10/625; H01M 10/647; H01M 10/6568; H01M 2220/20
See application file for complete search history.

(56) References Cited

U.S. PATENT DOCUMENTS

2014/0335390 A1* 11/2014 Hwang ............. H01M 10/6557
429/72
2017/0170043 A1 6/2017 Oh et al.
(Continued)

FOREIGN PATENT DOCUMENTS

CN 208539064 U 2/2019
JP 2012195208 A 10/2012
(Continued)

OTHER PUBLICATIONS

International Search Report for PCT/KR2021/005272 dated Aug. 24, 2021. 3 pgs.
(Continued)

Primary Examiner — Christian Roldan
(74) Attorney, Agent, or Firm — Lerner David LLP

(57) ABSTRACT

A battery pack includes a plurality of battery modules and a tray including a mounting plate which extends horizontally so that the plurality of battery modules are mounted on the mounting plate. The mounting plate includes a feed pipe disposed on one side and configured to receive a refrigerant from outside, and the mounting plate includes a discharge pipe disposed on the other side and configured to discharge the refrigerant to the outside. The mounting plate includes a plurality of refrigerant channels, each refrigerant channel extending from the one side to the other side and being in communication with the feed pipe or the discharge pipe. The battery pack desirably reduces manufacturing cost and (Continued)

improves safety by reducing the number of components and simplifying the assembly process.

10 Claims, 8 Drawing Sheets

(51) Int. Cl.
 *H01M 10/647* (2014.01)
 *H01M 10/6556* (2014.01)
 *H01M 10/6568* (2014.01)
(52) U.S. Cl.
 CPC ..... *H01M 10/647* (2015.04); *H01M 10/6568* (2015.04); *H01M 2220/20* (2013.01)

(56) References Cited

U.S. PATENT DOCUMENTS

| | | | |
|---|---|---|---|
| 2017/0365887 A1 | 12/2017 | Kwon et al. | |
| 2018/0123192 A1* | 5/2018 | Fees | H01M 50/24 |
| 2019/0312322 A1 | 10/2019 | Ahn et al. | |
| 2019/0319319 A1 | 10/2019 | Yamagishi et al. | |
| 2020/0006824 A1 | 1/2020 | Lim | |
| 2020/0036061 A1 | 1/2020 | Kim et al. | |
| 2020/0067156 A1 | 2/2020 | Chi et al. | |
| 2020/0194851 A1 | 6/2020 | Seo et al. | |
| 2021/0066769 A1 | 3/2021 | Hong et al. | |
| 2021/0119282 A1 | 4/2021 | Wunsche et al. | |
| 2021/0129651 A1 | 5/2021 | Klomberg et al. | |
| 2022/0320622 A1* | 10/2022 | Tofukuji | H01M 10/6568 |
| 2023/0231228 A1* | 7/2023 | Taniguchi | H01M 10/6568 429/72 |
| 2024/0030517 A1 | 1/2024 | Seo et al. | |

FOREIGN PATENT DOCUMENTS

| | | | | |
|---|---|---|---|---|
| JP | 2017506836 | A | | 3/2017 |
| JP | 2019186149 | A | | 10/2019 |
| JP | 2021516187 | A | | 7/2021 |
| KR | 20150081514 | A | | 7/2015 |
| KR | 20150111757 | A | | 10/2015 |
| KR | 101593386 | B1 | | 2/2016 |
| KR | 20170119824 | A | | 10/2017 |
| KR | 20170142442 | A | | 12/2017 |
| KR | 20180081000 | A | | 7/2018 |
| KR | 20180083140 | A | | 7/2018 |
| KR | 20180113419 | A | * | 10/2018 |
| KR | 20180133729 | A | | 12/2018 |
| KR | 20190110782 | A | | 10/2019 |
| KR | 20190133434 | A | | 12/2019 |
| KR | 20190139620 | A | | 12/2019 |
| KR | 20200001781 | A | | 1/2020 |
| KR | 20200020482 | A | | 2/2020 |
| KR | 20200041007 | A | | 4/2020 |
| NO | 2018131776 | A1 | | 7/2018 |
| WO | 2013105756 | A1 | | 7/2013 |
| WO | 2018182162 | A1 | | 10/2018 |
| WO | WO-2019221376 | A1 | * | 11/2019 ............. B60L 50/64 |

OTHER PUBLICATIONS

Extended European Search Report including Written Opinion for Application No. 21795658.0 dated Nov. 14, 2022, pp. 1-7.

* cited by examiner

BATTERY PACK, ELECTRONIC DEVICE COMPRISING SAME, AND VEHICLE

CROSS-REFERENCE TO RELATED APPLICATIONS

The present application is a national phase entry under 35 U.S.C. § 371 of International Application No. PCT/KR2021/005272, filed Apr. 26, 2021, which claims priority from Korean Patent Application No. 10-2020-0052831 filed on Apr. 29, 2020, the disclosures of all of which are incorporated herein by reference.

TECHNICAL FIELD

The present disclosure relates to a battery module, a battery pack comprising the same, an electric device and a vehicle, and more particularly, to a battery pack with reduced manufacturing cost and improved safety by a simplified assembly process with the reduced number of components.

BACKGROUND ART

Recently, with the rapid increase in demand for portable electronic products such as laptop computers, video cameras and mobile phones and the extensive development of electric vehicles, accumulators for energy storage, robots and satellites, many studies are being made on high performance secondary batteries that can be repeatedly recharged.

Currently, commercially available secondary batteries include nickel-cadmium batteries, nickel-hydrogen batteries, nickel-zinc batteries, lithium secondary batteries and the like, and among them, lithium secondary batteries have little or no memory effect, and thus they are gaining more attention than nickel-based secondary batteries for their advantages that recharging can be done whenever it is convenient, the self-discharge rate is very low and the energy density is high.

A lithium secondary battery primarily uses a lithium-based oxide and a carbon material as a positive electrode active material and a negative electrode active material, respectively. Additionally, the lithium secondary battery includes an electrode assembly including a positive electrode plate and a negative electrode plate coated with the positive electrode active material and the negative electrode active material, respectively, with a separator interposed between the positive electrode plate and the negative electrode plate, and a packaging or a battery case in which the electrode assembly is hermetically received together with an electrolyte solution.

Additionally, lithium secondary batteries may be classified into can-type secondary batteries, including the electrode assembly embedded in a metal can, and pouch-type secondary batteries, including the electrode assembly embedded in a pouch of an aluminum laminate sheet according to the shape of the packaging.

In particular, more recently, large capacity battery packs applied to electric vehicles are increasing in demand. The large capacity battery packs are prone to heat accumulation since a plurality of secondary batteries is charged and discharged, and to increase the service life of the battery packs, effective cooling is necessary. Accordingly, in general, the large capacity battery packs have separate cooling members having pack-scale large cooling capability.

However, the material cost and the assembly cost increase in the process of separately manufacturing the cooling member having pack-scale large cooling capability and coupling it to the battery pack, and the high volume of the cooling member reduces the energy density of the battery pack.

Further, the battery packs mounted in vehicles need to respond to large impacts in the event of vehicle collisions. Accordingly, the battery packs need to solve the problem of damage of the internal components caused by external impacts or fires or explosions in the secondary battery. In particular, when the cooling members are damaged, refrigerants leak in the cooling members, causing electric short circuits between battery modules.

DISCLOSURE

Technical Problem

The present disclosure is designed to solve the above-described problem, and therefore the present disclosure is directed to providing a battery pack with reduced manufacturing cost and improved safety by a simplified assembly process with the reduced number of components.

These and other objects and advantages of the present disclosure may be understood by the following description, and will be apparent from the embodiments of the present disclosure. In addition, it will be readily appreciated that the objects and advantages of the present disclosure may be realized by means and combinations thereof.

Technical Solution

To achieve the above-described object, a battery pack according to the present disclosure includes a plurality of battery modules, and a tray including a mounting plate which extends horizontally so that the plurality of battery modules is mounted on the mounting plate.

Additionally, the mounting plate includes a feed pipe disposed on one side and configured to receive a refrigerant from outside, and a discharge pipe disposed on the other side of the mounting plate and configured to discharge the refrigerant to the outside, and the mounting plate includes a plurality of refrigerant channels, each refrigerant channel extending from one side to the other side and being in communication with the feed pipe or the discharge pipe.

Additionally, the battery module may include an inlet configured to feed the refrigerant into the battery module, and an outlet configured to discharge the refrigerant out of the battery module.

Further, the mounting plate may include an inlet port connected with the inlet to feed the refrigerant from the refrigerant channel to the battery module, and an outlet port connected with the outlet to discharge the refrigerant from the battery module to the refrigerant channel.

Additionally, the inlet port and the outlet port may include a post which extends upward from an upper surface of the mounting plate, a ring gasket fixed to a part of the post, and a support gasket spaced a predetermined distance apart from the post and configured to come into close contact with a perimeter of the inlet or the outlet of the battery module.

Additionally, the tray may further include a front frame coupled to a front end of the mounting plate and having a plate shape standing vertically, a rear frame coupled to a rear end of the mounting plate and having a plate shape standing vertically, a pair of side covers having two ends which extend in one direction, the two extended ends being coupled with the front frame and the rear frame respectively, and a base plate having a plate shape extending horizontally and configured to be coupled with a bottom of the mounting plate.

Further, the mounting plate may include a mounting portion having a plate shape extending horizontally so that the plurality of battery modules is mounted on the mounting portion, a coupling portion which extends downward from a lower surface of the mounting portion, extends one side of the mounting portion to the other side and has a bottom coupled with the base plate, and a joining portion at which the refrigerant channel and the base plate are coupled.

Additionally, the side cover may include a pipe receiving portion of which an outer wall is configured to cover at least part of the feed pipe or the discharge pipe to receive the feed pipe or the discharge pipe.

Additionally, the tray may include a temporary storage configured such that when the refrigerant leaks in the feed pipe or the discharge pipe, the leaking refrigerant may flow into temporary storage.

Further, the temporary storage may be an empty space between the mounting plate and the base plate.

Additionally, to achieve the above-described object, an electronic device according to the present disclosure includes at least one battery pack.

Additionally, to achieve the above-described object, a vehicle according to the present disclosure includes at least one battery pack.

Advantageous Effects

According to an aspect of the present disclosure, the mounting plate includes the feed pipe disposed on one side and configured to receive the refrigerant from the outside, and the discharge pipe disposed on the other side of the mounting plate and configured to discharge the refrigerant to the outside, and the mounting plate includes the plurality of refrigerant channels, each extending from one side to the other side and being in communication with the feed pipe or the discharge pipe, and thus as opposed to the conventional battery pack, there is no separate cooling member, and the mounting plate of the tray on which the plurality of battery modules is mounted includes the feed pipe, the discharge pipe and the refrigerant channels, so the cooling member is integrally formed on the structure of a part of the mounting plate, thereby eliminating the need to separately manufacture the cooling member, and further, eliminating the need to couple or assemble the separate cooling member with the mounting plate. Accordingly, it is possible to reduce the manufacturing cost of the battery pack, as well as reducing the heat conduction path from the battery modules to the refrigerant channels, thereby increasing the cooling efficiency.

Additionally, according to an aspect of the present disclosure, the side cover includes the pipe receiving portion configured such that the outer wall covers at least part of the feed pipe or the discharge pipe to receive the feed pipe or the discharge pipe, so the side covers covers the feed pipe or the discharge pipe to protect it, thereby preventing the feed pipe or the discharge pipe from being damaged by external impacts.

BRIEF DESCRIPTION OF THE DRAWINGS

The accompanying drawings illustrate the preferred embodiments of the present disclosure, and together with the following detailed description, serve to provide a further understanding of the technical aspect of the present disclosure. However, the present disclosure should not be construed as being limited to the drawings.

DETAILED DESCRIPTION

Figure 1:
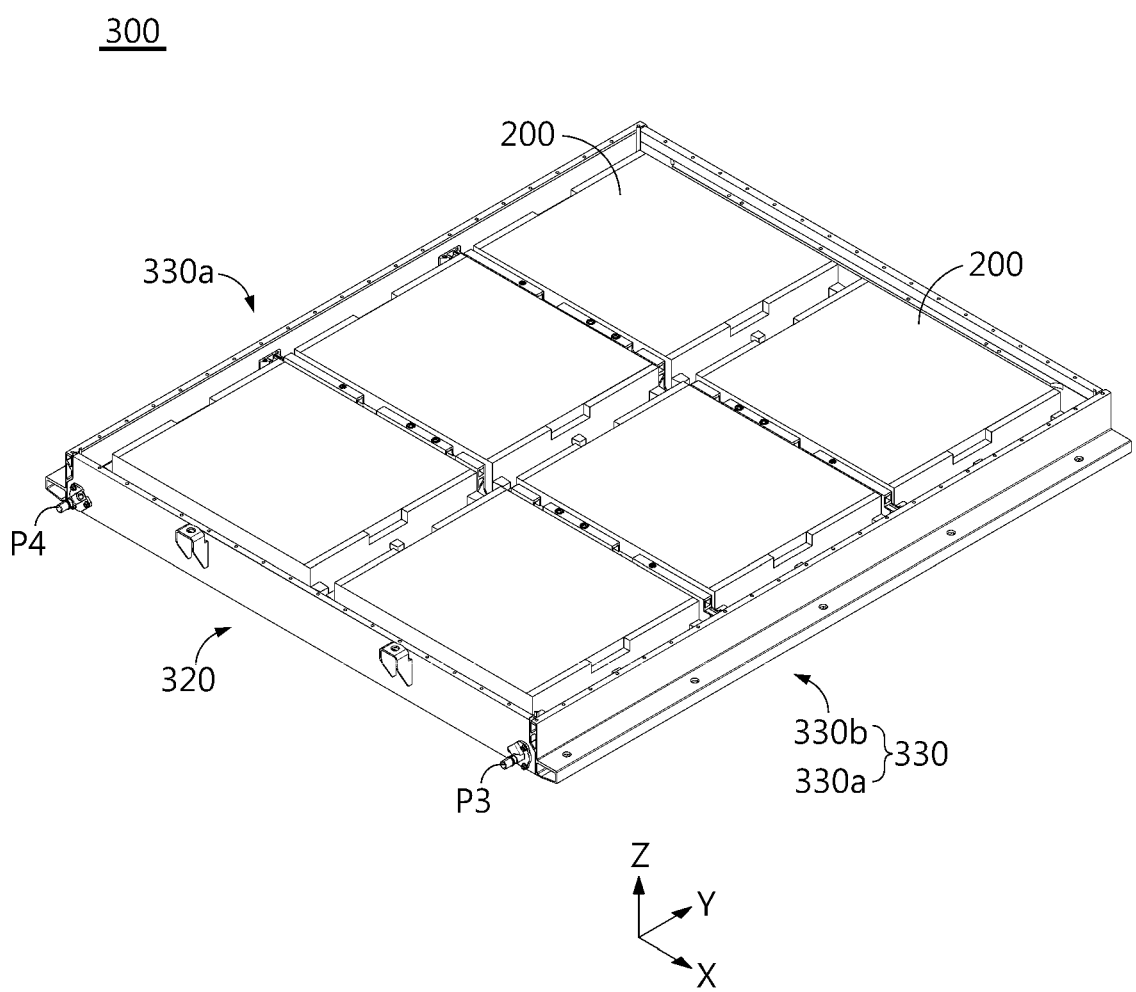
FIG. 1 is a perspective view schematically showing a battery pack according to an embodiment of the present disclosure.

Hereinafter, the preferred embodiments of the present disclosure will be described in detail with reference to the accompanying drawings. Prior to the description, it should be understood that the terms or words used in the specification and the appended claims should not be construed as being limited to general and dictionary meanings, but rather interpreted based on the meanings and concepts corresponding to the technical aspects of the present disclosure on the basis of the principle that the inventor is allowed to define the terms appropriately for the best explanation.

Therefore, the embodiments described herein and the illustrations shown in the drawings are just a most preferred embodiment of the present disclosure, but not intended to fully describe the technical aspects of the present disclosure, so it should be understood that a variety of other equivalents and modifications could have been made thereto at the time that the application was filed.

Figure 2:
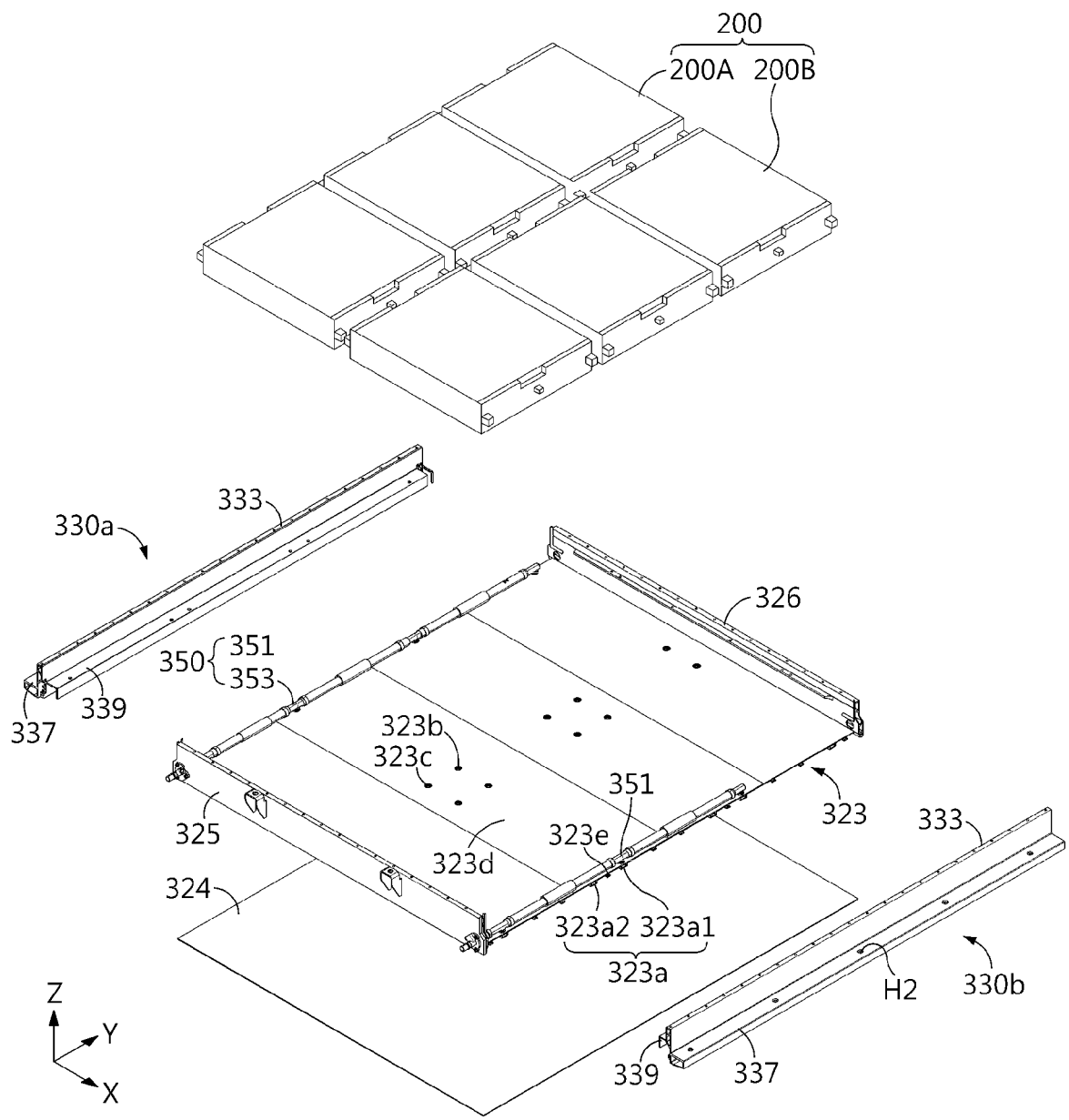
FIG. 2 is an exploded perspective view schematically showing the components of a battery pack according to an embodiment of the present disclosure.

FIG. 1 is a perspective view schematically showing a battery pack according to an embodiment of the present disclosure. Additionally, FIG. 2 is an exploded perspective view schematically showing the components of the battery pack according to an embodiment of the present disclosure. In FIG. 2, Y axis indicates the front and rear direction, X axis indicates the left and right direction, and Z axis indicates the up and down direction.

Referring to FIGS. 1 and 2, the battery pack 300 according to an embodiment of the present disclosure includes a plurality of battery modules 200 and a tray 320.

Specifically, the battery module 200 may include a plurality of secondary batteries. The secondary battery may be a pouch-type secondary battery including an electrode assembly (not shown), an electrolyte solution (not shown), and a pouch in which the electrode assembly and the electrolyte solution are received. However, the battery pack 300 according to the present disclosure is not limited to the above-described pouch-type secondary battery and may employ various types of secondary batteries known at the time of filing the patent application.

The battery pack 300 may include at least one busbar (not shown) configured to electrically connect the plurality of secondary batteries. Specifically, the busbar may include an electrically conductive metal, for example, copper, aluminum and nickel.

Further, the battery pack 300 may include a wire type busbar (not shown) electrically connecting the plurality of battery modules 200.

Figure 3:
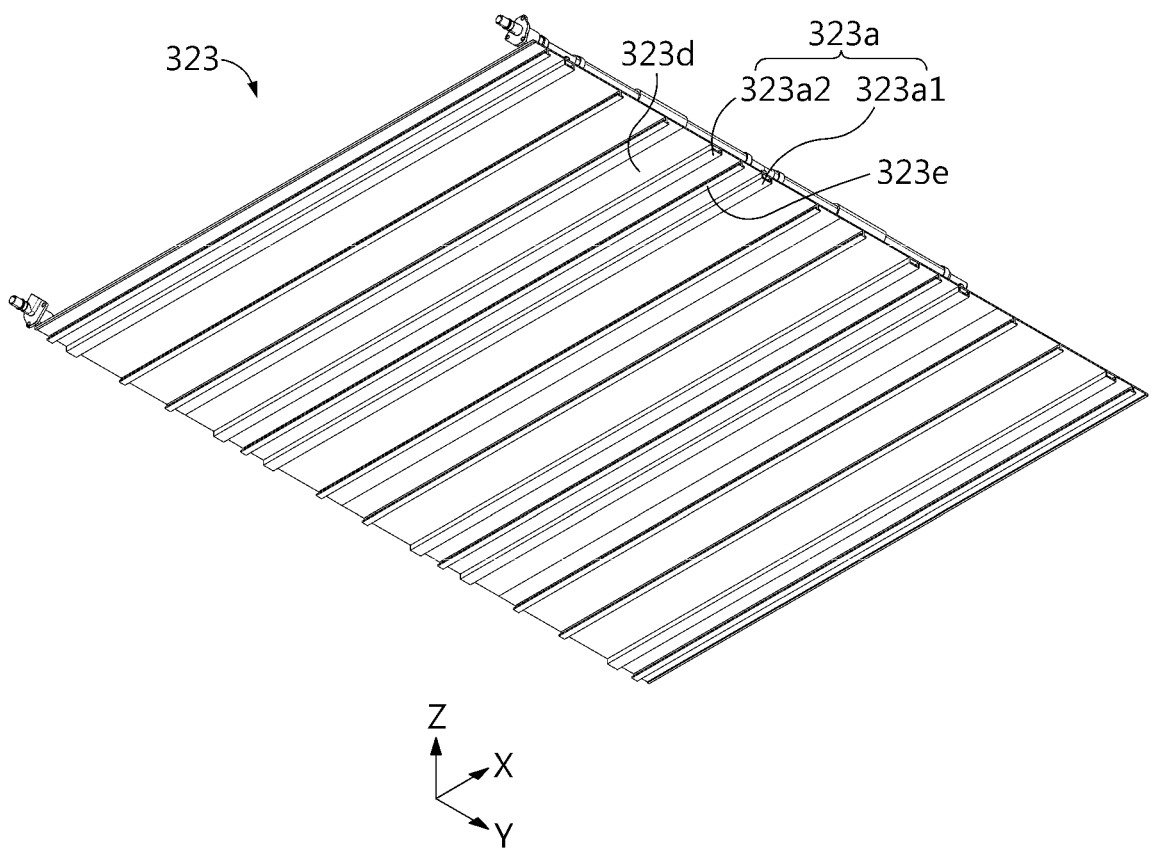
FIG. 3 is a perspective view schematically showing a mounting plate of a battery pack according to an embodiment of the present disclosure.

FIG. 3 is a perspective view schematically showing a mounting plate of the battery pack according to an embodiment of the present disclosure. Additionally, FIG. 4 is a partial side view schematically showing the mounting plate of FIG. 3.

Figure 4:
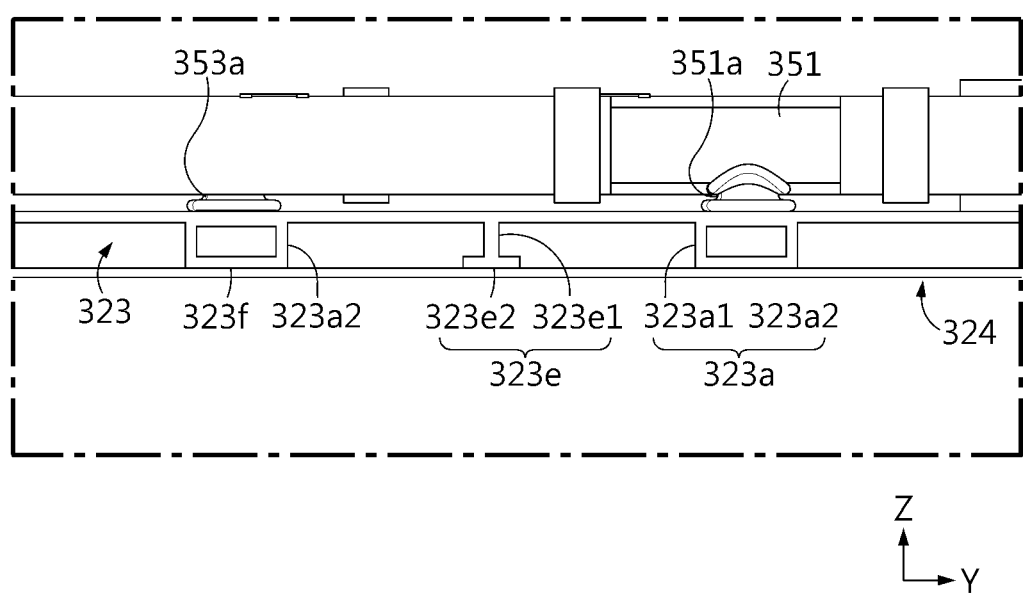
FIG. 4 is a partial side view schematically showing the mounting plate of FIG. 3.

Referring to FIGS. 3 and 4 together with FIGS. 1 and 2, the tray 320 may include the mounting plate 323. The plurality of battery modules 200 may be mounted on the mounting plate 323. The mounting plate 323 may be in the shape of a plate that extends in a horizontal direction. Here, the horizontal direction refers to a direction that is parallel to the ground when the battery pack 300 is placed on the ground.

Additionally, the mounting plate 323 may include a feed pipe 351 and a discharge pipe 353. The feed pipe 351 may be disposed on one side of the mounting plate 323. The discharge pipe 353 may be disposed on the other side of the mounting plate 323. The feed pipe 351 may be configured to receive a refrigerant from the outside. The discharge pipe 353 may be configured to discharge the refrigerant to the outside.

For example, as shown in FIG. 1, the refrigerant may be fed from an external device into an inlet P3 of the front end part of the feed pipe 351. The feed pipe 351 may be configured to supply the refrigerant to a refrigerant channel 323a1 of the mounting plate 323 as described below. Additionally, the temperature increased refrigerant may move from a refrigerant channel 323a2 of the mounting plate 323 to the discharge pipe 353, and the refrigerant may move to the external device through an outlet P4 of the front end part of the discharge pipe 353.

Further, the mounting plate 323 may include a plurality of refrigerant channels 323a. Each of the plurality of refrigerant channels 323a may extend from one side (right side, positive X axis direction) of the mounting plate 323 to the other side (left side, negative X axis direction) of the mounting plate 323. Each of the plurality of refrigerant channels 323a may be connected in communication with the feed pipe 351 or the discharge pipe 353. For example, as shown in FIG. 4, a connecting part 351a may be an extended part of the feed pipe 351 and connected with the refrigerant channel 323a1 of the mounting plate 323. Although the entire shape is not shown in FIG. 4, the discharge pipe 353 may include a connecting part 353a connected with the refrigerant channel 323a2.

Additionally, the refrigerant channels 323a may extend from one side of the mounting plate 323 to the other side. For example, as shown in FIG. 3, the refrigerant channels 323a may extend from the right end of the mounting plate 323 to the left end.

According to this configuration of the present disclosure, the mounting plate 323 includes the feed pipe 351 disposed on one side and configured to receive the refrigerant from the outside, and the discharge pipe 353 disposed on the other side of the mounting plate 323 and configured to discharge the refrigerant to the outside, and the mounting plate 323 includes the plurality of refrigerant channels 323a, each extending from one side to the other side and being in communication with the feed pipe 351 or the discharge pipe 353, and thus, as opposed to a conventional battery pack 300, there is no separate cooling member, and the mounting plate 323 of the tray 320 on which the plurality of battery modules 200 is mounted includes the feed pipe 351, the discharge pipe 353 and the refrigerant channels 323a, so the cooling member is integrally formed on the structure of a part of the mounting plate, thereby eliminating the need to separately manufacture the cooling member, and further, eliminating the need to couple or assemble the separate cooling member with the mounting plate. Accordingly, it is possible to reduce the manufacturing cost of the battery pack, as well as reducing the heat conduction path from the battery modules 200 to the refrigerant channels 323a, thereby increasing the cooling efficiency.

Further, among the plurality of refrigerant channels 323a of the mounting plate 323, the refrigerant channel 323a1 is in communication with the feed pipe 351 and the remaining refrigerant channel 323a2 is in communication with the discharge pipe 353, thereby simplifying the cooling structure. Accordingly, it is easy to manufacture the battery pack 300.

Figure 5:
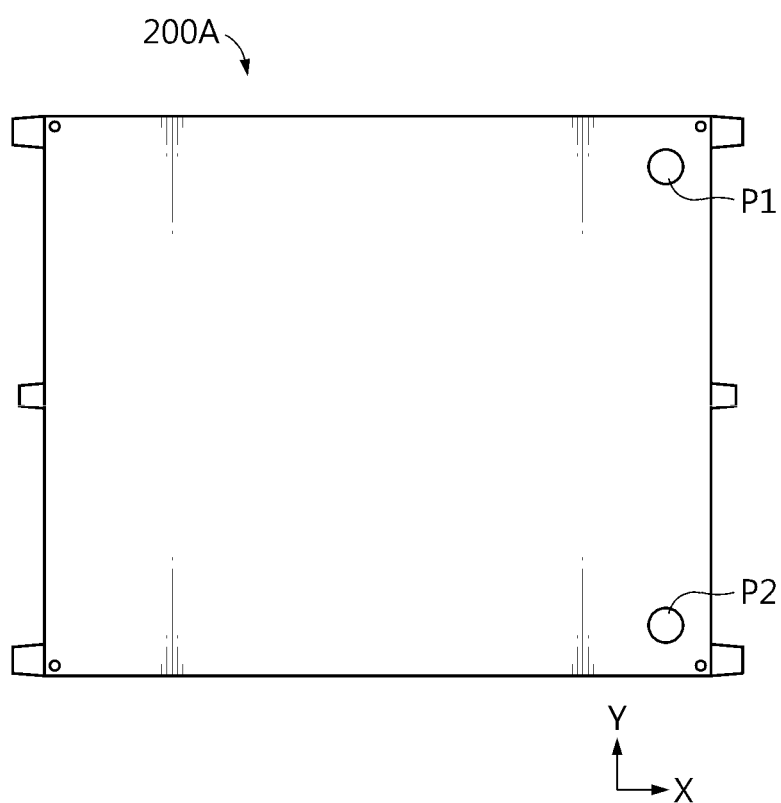
FIGS. 5 and 6 are bottom views schematically showing battery modules of a battery pack according to an embodiment of the present disclosure.
Figure 6:
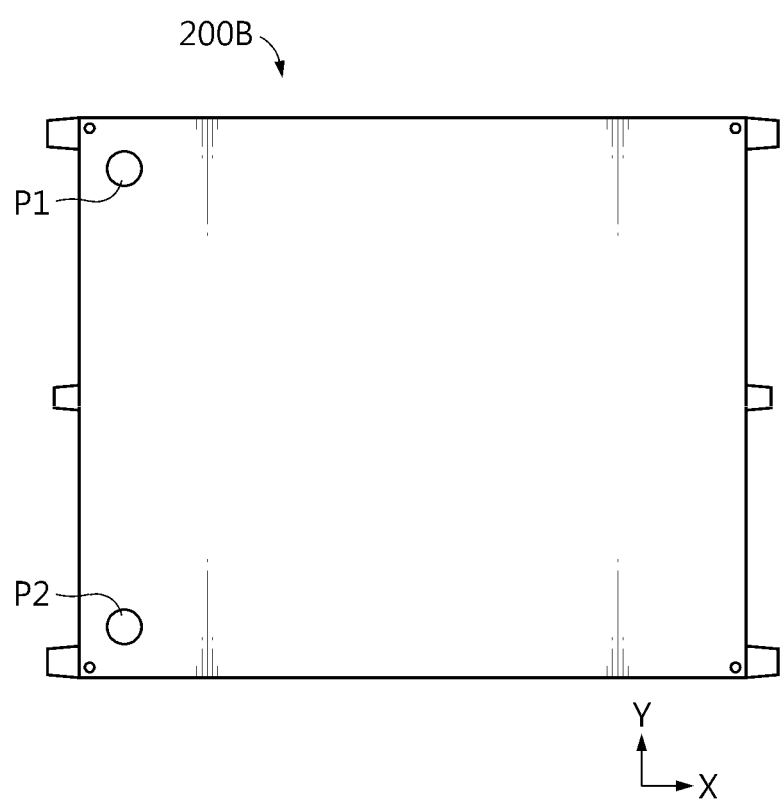

FIGS. 5 and 6 are bottom views schematically showing the battery modules of the battery pack according to an embodiment of the present disclosure.

Referring to FIGS. 5 and 6 together with FIGS. 2 and 4, the battery module 200A may include an inlet P1 and an outlet P2. The inlet P1 may be configured to supply the refrigerant to the battery module 200A. For example, the inlet P1 may be in communication with the refrigerant channel 323a1 connected with the feed pipe 351 of the mounting plate 323. The outlet P2 may be configured to allow the refrigerant to exit the battery module 200A. The outlet P2 may be in communication with the refrigerant channel 323a2 connected to the discharge pipe 353 of the mounting plate 323.

For example, as shown in FIG. 2, when six battery modules 200 are arranged in two rows and three columns, the battery module 200A disposed in the first row (left side) may have the inlet P1 and the outlet P2 on the left side of the lower surface of the battery module 200 as shown in FIG. 5. Additionally, the battery module 200B disposed in the second row (right side) may have the inlet P1 and the outlet P2 on the right side of the lower surface of the battery module 200 as shown in FIG. 6.

Additionally, the battery module 200 may include a separate cooling member (not shown) configured to cool the plurality of secondary batteries in the battery module 200 using the refrigerant fed through the inlet P1. For example, the cooling member may be a heat sink. After the temperature of the refrigerant fed into the cooling member is increased, the cooling member may discharge the temperature increased refrigerant through the outlet P2.

Figure 7:
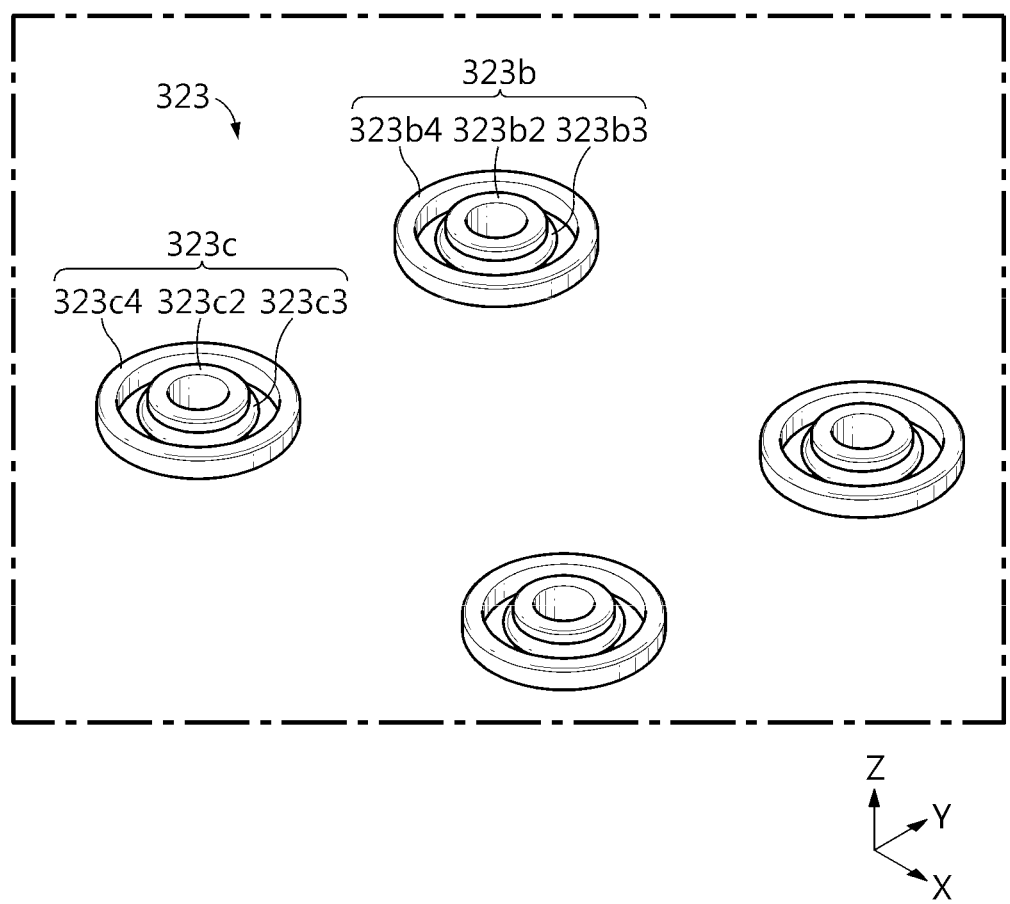
FIG. 7 is a partial perspective view schematically showing a mounting plate of a battery pack according to an embodiment of the present disclosure.

FIG. 7 is a partial perspective view schematically showing the mounting plate of the battery pack according to an embodiment of the present disclosure.

Referring to FIG. 7 together with FIGS. 2, 5 and 6, the mounting plate 323 may include an inlet port 323b and an outlet port 323c. The inlet port 323b may be connected to feed the inlet P1 the refrigerant from the refrigerant channel 323a to the battery module 200. The outlet port 323c may be configured to discharge the refrigerant from the battery module 200 to the refrigerant channel 323a.

According to this configuration of the present disclosure, the battery module 200 has the inlet P1 and the outlet P2, and the mounting plate 323 has the inlet port 323b and the outlet port 323c, thereby smoothly moving the refrigerant fed into the refrigerant channel 323a of the mounting plate 323 into the battery modules 200.

Specifically, the inlet port 323*b* may include a post 323*b*2, a ring gasket 323*b*3 and a support gasket 323*b*4. The post 323*b*2 may extend upward from the upper surface of the mounting plate 323 (in the positive Z axis direction of FIG. 2). The post 323*b*2 may be in the shape of a hollow circular tube.

Additionally, the ring gasket 323*b*3 may be fixed to a part of the post 323*b*2. For example, the post 323*b*2 may have a fixing groove (not shown) of which the periphery extends inward. A part of the ring gasket 323*b*3 may be inserted into the fixing groove.

Further, the support gasket 323*b*4 may be spaced a predetermined distance apart from the post 323*b*2. The support gasket 323*b*4 may be in the shape of a ring. The support gasket 323*b*4 may be configured to come into close contact with the perimeter of the inlet P1 of the battery module 200. The support gasket 323*b*4 may be configured to provide upward support to the lower surface of the battery module 200.

Specifically, the outlet port 323*c* may include a post 323*c*2, a ring gasket 323*c*3 and a support gasket 323*c*4. The post 323*c*2 may extend upward from the upper surface of the mounting plate 323. The post 323*c*2 may be in the shape of a hollow circular tube.

Additionally, the ring gasket 323*c*3 may be fixed to a part of the post 323*c*2. For example, the post 323*c*2 may have a fixing groove of which the periphery extends inward. A part of the ring gasket 323*c*3 may be inserted into the fixing groove.

Further, the support gasket 323*c*4 may be spaced a predetermined distance apart from the post 323*c*2. The support gasket 323*c*4 may be in the shape of a ring. The support gasket 323*c*4 may be configured to come into close contact with the perimeter of the outlet P2 of the battery module 200. The support gasket 323*c*4 may be configured to provide upward support to the lower surface of the battery module 200.

According to this configuration of the present disclosure, each of the inlet port 323*b* and the outlet port 323*c* includes the post 323*b*2, the ring gasket 323*b*3, and the support gasket 323*b*4, thereby performing two-step sealing using two gaskets. Accordingly, the present disclosure may prevent the refrigerant from leaking in the process of feeding the refrigerant from the refrigerant channel 323*a* into the battery module 200 or the process of discharging the refrigerant from the battery module 200 to the refrigerant channel 323*a*.

Further, according to the present disclosure, it is possible to guide the arrangement position of the battery modules 200 by inserting the post 323*b*2 into the inlet P1 or the outlet P2 of the battery module 200, thereby making assembly easy and reducing the manufacturing time.

Figure 8:
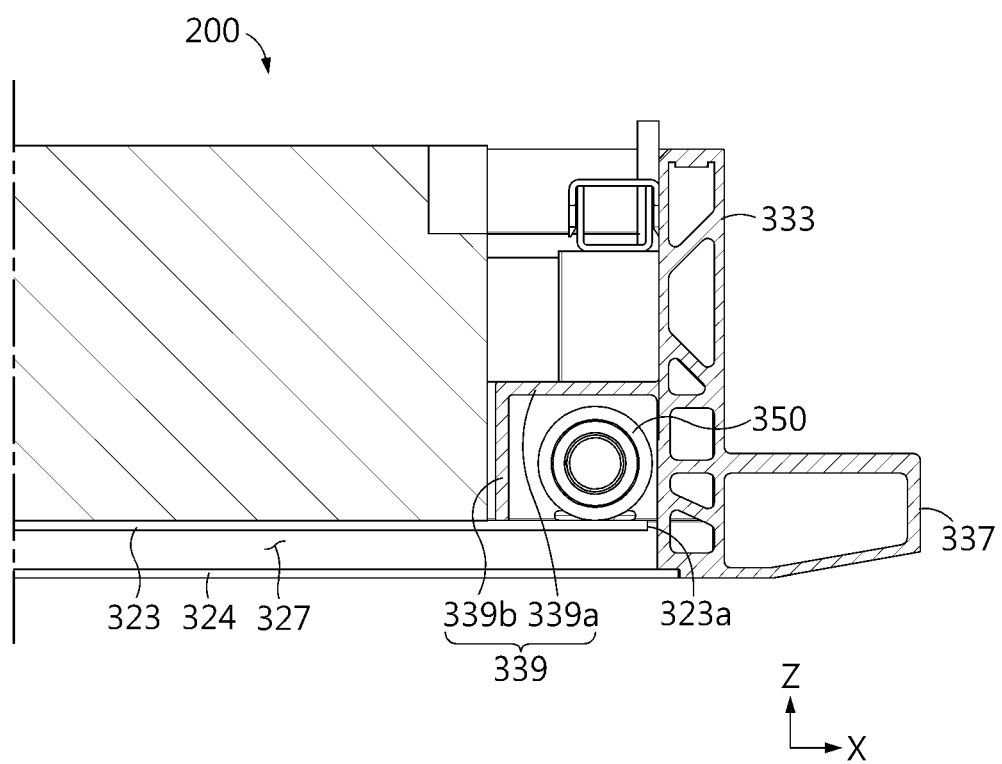
FIG. 8 is a partial bottom view schematically showing a battery module of a battery pack according to an embodiment of the present disclosure.

FIG. 8 is a partial bottom view schematically showing the battery module of the battery pack according to an embodiment of the present disclosure.

Referring to FIG. 8 together with FIGS. 1 and 2, the tray 320 may further include a front frame 325, a rear frame 326, a pair of side covers 330 and a base plate 324. Specifically, the front frame 325 may be coupled to the front end of the mounting plate 323. The front frame 325 may be in the shape of a plate that stands vertically. The front frame 325 may serve as a front wall of the tray 320. The rear frame 326 may be coupled to the rear end of the mounting plate 323. The rear frame 326 may be in the shape of a plate that stands vertically. The rear frame 326 may serve as a rear wall of the tray 320.

Additionally, the side covers 330 may extend in one direction. The side covers 330 may be formed by extrusion molding. The front ends of the side covers 330 may be coupled with the front frame 325. The rear ends of the side covers 330 may be coupled with the rear frame 326.

Further, the side covers 330 may be disposed at one side and the other side of the mounting plate 323 of the tray 320, respectively. For example, as shown in FIGS. 2 and 8, the two side covers 330 may include body portions 333 disposed at the left end and the right end of the mounting plate 323, respectively. Accordingly, the body portions 333 may serve as left and right side walls of the battery pack 300. The body portions 333 may extend in the front and rear direction. For example, the body portion 333 may be in the shape of a plate formed by extrusion molding in the front and rear direction. The body portions 333 may stand in the up and down direction. The body portions 333 may be in the shape of a hollow plate.

Further, the base plate 324 may be in the shape of a plate that extends horizontally. The base plate 324 may have a size corresponding to the mounting plate 323. The base plate 324 may be coupled with the bottom of the mounting plate 323.

According to this configuration of the present disclosure, since the tray 320 of the present disclosure includes the front frame 325, the rear frame 326, the pair of side covers 330 and the base plate 324, the coupling structure of the front frame 325, the rear frame 326, the pair of side covers 330, the mounting plate 323 and the base plate 324 can effectively protect the internal components from external impacts in the left and right direction and the front and rear direction. Ultimately, it is possible to increase the safety of the battery pack 300 of the present disclosure.

Referring back to FIGS. 3 and 4, the mounting plate 323 may include a mounting portion 323*d* and a coupling portion 323*e*. The mounting portion 323*d* may be in the shape of a plate that extends horizontally so that the plurality of battery modules 200 is mounted on the mounting portion 323*d*.

Additionally, the coupling portion 323*e* may extend downward from the lower surface of the mounting portion 323*d* (in the negative Z axis direction of FIG. 2). The coupling portion 323*e* may include a down extended portion and a horizontal extended portion. The down extended portion and the horizontal extended portion may extend from one side to the other side along the lower surface of the mounting portion 323*d*. For example, as shown in FIG. 3, the coupling portion 323*e* may extend from the right end of the mounting plate 323 to the left end.

Further, the lower surface of the horizontal extended portion of the coupling portion 323*e* may be coupled with the upper surface of the base plate 324. Here, the coupling method may use friction stir welding. Here, the friction stir welding refers to a welding process that uses a non-consumable tool having a screw thread shaped protrusion to join two facing pieces of a material. When the tool is inserted into the material while rotating at a high speed, heat is generated by friction between the tool and the material, a region of the material near the tool is softened by the frictional heat and materials on both sides of the joint surface are forcibly intermixed by the plastic flow of the material by stir of the tool.

When the friction stir welding is used, it is possible to improve the mechanical properties and achieve better joining than the existing fusion joining, and lower heat input is put in welding than the existing fusion welding by the use of frictional heat between the joining tool and the specimen, resulting in low residual stress and less deformation.

According to this configuration of the present disclosure, the mounting plate 323 extends downward from the lower surface of the mounting portion 323*d* and has the coupling portion 323e which extends from one side of the mounting portion 323d to the other side and is coupled with the base plate 324 on the bottom, thereby effectively improving the joining strength between the mounting plate 323 and the base plate 324.

Additionally, the mounting plate 323 may include a joining portion 323f at which the lower surface of the refrigerant channel 323a is coupled with the upper surface of the base plate 324. In this instance, likewise, friction stir welding may be used. Meanwhile, since the cooling member including the separate refrigerant channel 323a according to the conventional art is not stably coupled to the mounting plate 323, the cooling member may be damaged due to interference in the process of coupling the mounting plate 323 and the base plate 324. Accordingly, the size of the cooling member may be reduced to prevent interference with the base plate 324, but when the size of the cooling member is reduced, the cooling efficiency of the battery pack 300 reduces.

In contrast, the present disclosure forms the refrigerant channel 323a in the mounting plate 323 itself and directly couples the refrigerant channel 323a with the upper surface of the base plate 324, thereby effectively increasing the coupling area between the mounting plate 323 and the base plate 324. Further, it is possible to solve the problem of the decline in cooling capability resulting from the reduced refrigerant channel 323a by maximizing the size of the refrigerant channel 323a in a space between the mounting plate 323 and the base plate 324.

Meanwhile, referring back to FIGS. 2 and 8, the side cover 330 may include a pipe receiving portion 339 configured to cover at least part of the feed pipe 351 to receive the feed pipe 351. Alternatively, the side cover 330 may include the pipe receiving portion 339 configured to cover at least part of the discharge pipe 353 to receive the discharge pipe 353.

Referring back to FIG. 8 together with FIG. 2, the pipe receiving portion 339 may be a space formed such that the outer wall covers at least part of the cooling pipe 350. For example, as shown in FIG. 8, the pipe receiving portion 339 may include a portion 339a of which the outer wall extends inward (rightward) from the inner surface of the body portion 333, and a remaining portion 339b which is bent and extends downward from the end portion of the extended portion 339a.

According to this configuration of the present disclosure, the side cover 330 includes the pipe receiving portion 339 configured such that the outer wall covers at least part of the feed pipe 351 or the discharge pipe 353 to receive the feed pipe 351 or the discharge pipe 353, so the side covers 330 cover the feed pipe 351 or the discharge pipe 353 to protect it, thereby preventing the feed pipe 351 or the discharge pipe 353 from being damaged by external impacts.

Meanwhile, referring back to FIG. 8, the tray 320 may include a temporary storage 327. Specifically, the temporary storage 327 may be configured to allow the leaking refrigerant to flow into the temporary storage 327 when the refrigerant leaks in the cooling pipe 350. For example, as shown in FIG. 8, the temporary storage 327 may be formed in a space between the mounting plate 323 and the base plate 324.

Additionally, the end portion 323a of the mounting plate 323 may be spaced apart from the body portion 333 of the side cover 330. When the refrigerant leaks in the cooling pipe 350, the leaking refrigerant may flow into the temporary storage 327 using the gap between the end portion of the mounting plate 323 and the side cover 330.

According to this configuration of the present disclosure, the tray 320 includes the temporary storage 327 to allow the leaking refrigerant to flow into the temporary storage 327 when the refrigerant leaks in the cooling pipe 350, thereby prevent the leaking refrigerant from entering the battery modules 200 and preventing electrical leakage and electric circuit in the battery modules 200 by the refrigerant.

Meanwhile, referring back to FIGS. 2 and 8, the side cover 330 may further include a mounting portion 337. The mounting portion 337 may be provided on the outer side of the body portion 333 to be coupled with an external device. The mounting portion 337 may have a coupling structure for coupling with the external device. For example, the mounting portion 337 may be bolt-coupled with the components in the vehicle body. The mounting portion 337 may have a bolting hole H2 for insertion of a bolt.

According to this configuration of the present disclosure, the present disclosure further includes the mounting portion 337 having the coupling structure for coupling the side cover 330 with the external device and provided on the outer side of the body portion 333, thereby stably fixing the battery pack 300 to the external device.

Further, the mounting portion 337 may be configured to protect the plurality of battery modules 200 disposed inside from external impacts. To this end, the mounting portion 337 may extend in the outward direction of the body portion 333. The mounting portion 337 may have a hollow shape. That is, when impacts are applied on the left and right sides of the battery pack 300, the mounting portion 337 may extend outward to absorb or defend the impacts.

Meanwhile, the battery pack 300 according to an embodiment of the present disclosure may further include various types of devices (not shown) for controlling the charge/discharge of the battery module 200, for example, a Battery Management System (BMS), a current sensor and a fuse.

Meanwhile, an electronic device (not shown) according to an embodiment of the present disclosure includes at least one battery pack 300. The electronic device may further include a device housing (not shown) having a receiving space for receiving the battery pack 300 and a display to allow a user to see the state of charge of the battery pack 300.

Additionally, the battery pack 300 according to an embodiment of the present disclosure may be included in a vehicle such as an electric vehicle or a hybrid electric vehicle. That is, the battery pack 300 according to an embodiment of the present disclosure may be mounted in the vehicle according to an embodiment of the present disclosure. In this instance, the side covers 330 may be coupled with the body of the vehicle.

Meanwhile, the terms indicating directions as used herein such as upper, lower, left, right, front and rear are used for convenience of description only, and it is obvious to those skilled in the art that the term may change depending on the position of the stated element or an observer.

While the present disclosure has been hereinabove described with regard to a limited number of embodiments and drawings, the present disclosure is not limited thereto and it is obvious to those skilled in the art that various modifications and changes may be made thereto within the technical aspects of the present disclosure and the equivalent scope of the appended claims.

DESCRIPTION OF REFERENCE NUMERALS

300: Battery pack
200: Battery module
100: Secondary battery

210: Module housing
320: Tray
323, 324: Mounting plate, Base plate
323a, 323a1, 323a2: Refrigerant channel
323b1, 323c1: Inlet port, Outlet port
323b2, 323b3, 323b4: Post, Ring gasket, Support gasket
323c2, 323c3, 323c4: Post, Ring gasket, Support gasket
323d, 323e, 323f: Mounting portion, Coupling portion, Joining portion
325, 326: Front frame, Rear frame
327: Temporary storage
330, 330a, 330b: Side cover
333, 337, 339: Body portion, Mounting portion, Pipe receiving portion
351, 353: Feed pipe, Discharge pipe
P1, P2: Inlet, Outlet

What is claimed is:

1. A battery pack, comprising:
a plurality of battery modules;
a tray including a mounting plate which extends horizontally so that the plurality of battery modules are mounted on the mounting plate,
wherein the mounting plate includes a feed pipe configured to receive a refrigerant from outside of the battery pack, and the mounting plate includes a discharge pipe configured to discharge refrigerant outside of the battery pack, the feed pipe being disposed on a first side of the mounting plate and the discharge pipe being disposed on a second side of the mounting plate, opposite the first side,
wherein the mounting plate includes a plurality of refrigerant channels, each refrigerant channel extending from the first side of the mounting plate to the second side of the mounting plate and being in communication with the feed pipe or the discharge pipe, and
wherein the plurality of refrigerant channels are connected with each battery module of the plurality of battery modules to supply refrigerant into each battery module of the plurality of battery modules.

2. The battery pack according to claim 1, wherein each of the plurality of battery modules includes:
an inlet configured for the supply of refrigerant into the battery module; and
an outlet configured to discharge refrigerant out of the battery module, and
wherein the mounting plate includes:
an inlet port connected with each inlet and configured to supply refrigerant from a refrigerant channel of the plurality of refrigerant channels to each battery module of the plurality of battery modules; and
an outlet port connected with each outlet and configured to discharge the refrigerant from the battery module to the plurality of refrigerant channels.

3. The battery pack according to claim 2, wherein the inlet port and the outlet port of each of the plurality of battery modules each include:
a post which extends upward from an upper surface of the mounting plate;
a ring gasket secured to at least a part of the post; and
a support gasket spaced a predetermined distance apart from the post and configured to securely engage a perimeter of the respective inlet or outlet of the battery module.

4. The battery pack according to claim 1, wherein the tray further includes:
a front frame coupled to a front end of the mounting plate and defining a vertical plate shape;
a rear frame coupled to a rear end of the mounting plate and defining a vertical plate shape;
a pair of side covers each having two opposed ends, the two opposed ends being coupled with the front frame and the rear frame, respectively; and
a base plate having a plate shape extending horizontally and configured to be coupled with a bottom of the mounting plate.

5. The battery pack according to claim 4, wherein the mounting plate includes:
a mounting portion having a plate shape extending horizontally so that the plurality of battery modules is mounted on the mounting portion;
a coupling portion which extends downward from a lower surface of the mounting portion, the coupling portion extending from the first side of the mounting plate to the second side of the mounting plate, the coupling portion having a bottom coupled to the base plate; and
a joining portion at which the plurality of refrigerant channels and the base plate are coupled.

6. The battery pack according to claim 5, wherein each side cover includes a pipe receiving portion defined by a portion of an outer wall of the side cover surrounding at least part of the feed pipe or the discharge pipe to receive the feed pipe or the discharge pipe therein.

7. The battery pack according to claim 5, wherein the tray includes a storage space configured such that if the refrigerant leaks from the feed pipe or the discharge pipe, the leaking refrigerant flows into and is temporarily received by the storage space.

8. The battery pack according to claim 7, wherein the storage space is an empty space between the mounting plate and the base plate.

9. An electronic device comprising at least one battery pack according to claim 1.

10. A vehicle comprising at least one battery pack according to claim 1.

* * * * *